United States Patent
Haynie et al.

(10) Patent No.: US 12,379,742 B1
(45) Date of Patent: Aug. 5, 2025

(54) SNOOP LOGIC FUNCTION STREAMING TIMERS

(71) Applicant: International Business Machines Corporation, Armonk, NY (US)

(72) Inventors: Howard Michael Haynie, Wappingers Falls, NY (US); Michael James Becht, Poughkeepsie, NY (US); Dan Vangor, Mahopac, NY (US); Bruce Ratcliff, Red Hook, NY (US); Girish Gopala Kurup, Bangalore (IN); Mushfiq Us Saleheen, Poughkeepsie, NY (US); Deepankar Bhattacharjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 18/424,312

(22) Filed: Jan. 26, 2024

(51) Int. Cl.
G06F 1/14 (2006.01)
G06F 13/36 (2006.01)

(52) U.S. Cl.
CPC .............. *G06F 1/14* (2013.01); *G06F 13/36* (2013.01)

(58) Field of Classification Search
None
See application file for complete search history.

(56) References Cited

U.S. PATENT DOCUMENTS

| | | | |
|---|---|---|---|
| 6,765,911 B1 | 7/2004 | Branstad et al. | |
| 7,774,519 B2 | 8/2010 | Casper et al. | |
| 8,255,638 B2 | 8/2012 | Blumrich et al. | |
| 8,761,189 B2 * | 6/2014 | Shachar | H04L 5/0055 370/463 |
| 11,271,838 B2 * | 3/2022 | Crabtree | H04J 3/0667 |
| 11,277,455 B2 * | 3/2022 | Levi | H04L 65/762 |
| 11,567,883 B2 * | 1/2023 | Veluswamy | G06F 9/5016 |
| 2004/0022094 A1 | 2/2004 | Radhakrishnan et al. | |
| 2006/0184949 A1 * | 8/2006 | Craddock | G06F 11/3419 719/314 |
| 2009/0077567 A1 | 3/2009 | Craddock et al. | |
| 2016/0117277 A1 | 4/2016 | Raindel et al. | |

OTHER PUBLICATIONS

International Searching Authority, "Notification of Transmittal of the International Search Report and the Written Opinion of the International Searching Authority, or Declaration," Patent Cooperation Treaty Apr. 10, 2025, 10 pages, International Application No.-PCT/IB2024/063114.

* cited by examiner

*Primary Examiner* — Elias Mamo
(74) *Attorney, Agent, or Firm* — Patterson + Sheridan, LLP (57) ABSTRACT

Embodiments of the present disclosure implement hardware-based snoop logic streaming timers for input/output (I/O) communications between a host and a shared network adapter in a computing system. The disclosed embodiments describe a hardware-based snoop logic and snoop logic timer function control of input/output (I/O) processor monitoring a defined memory area to detect a completion queue entry being written to a completion queue, and implementing streaming timers and interpacket timers, based on the completion queue entry and predefined configuration information for an associated host interface connection, to provide streaming data status, interpacket arrival times, and streaming timer expiration for the associated host interface connection.

20 Claims, 6 Drawing Sheets

| TIMER STATE Timer-PTR 402 | RD-PTR 404 | WT-PTR 406 |
|---|---|---|
|  | 0 | 0 |
|  | 1 | 1 |
| TIMES_OUT | 2 | 2 |
|  | 3 | 2 |
|  | 4 | 3 |
|  | 5 | 4 |
| TIMES_OUT | 6 | 5 |
|  | 7 | 5 |

SNOOP LOGIC FUNCTION STREAMING TIMERS

BACKGROUND

The present invention relates to computing systems, and more specifically, to implementing hardware-based snoop logic streaming timers for input/output (I/O) communications between a host and a shared network adapter in a computing system.

In computing systems, enabling I/O communications between a host and a shared network adapter remains a significant challenge, typically requiring a large number of timers with complex logic for a multiplicity of data connections. A shared network adapter (e.g., an I/O adapter) facilitates I/O communications that include the transfer of large amounts of data, such as streaming data, into or out of a host and host memory file system. Conventional I/O communications typically include streaming timer operations for each of the data connections, which often require complex hardware and significant time to complete. As modern computing systems evolve, it is increasingly difficult to provide effective and efficient I/O communications with conventional techniques.

SUMMARY

According to one embodiment of the present disclosure, a non-limiting computer implemented method is provided. The method comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration to the host interface connection.

According to one embodiment of the present disclosure, a system is provided. The system includes one or more computer processors, and a memory containing a program which when executed by the one or more computer processors performs an operation. The operation comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration to the host interface connection.

According to one embodiment of the present disclosure, a computer program product is provided. The computer program product includes a computer-readable storage medium having computer-readable program code embodied therewith, the computer-readable program code executable by one or more computer processors to perform an operation. The operation comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration for the host interface connection.

DETAILED DESCRIPTION

The embodiments herein describe a hardware-based snoop logic and snoop logic timer function control in an input/output (I/O) processor subsystem for implementing streaming timers and interpacket timers configured for each host interface connection with a shared network adapter of a computing system.

According to an aspect of disclosed embodiments, a non-limiting computer implemented method is provided. The computer-implemented method comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration to the host interface connection. The method enables enhanced processing speed, reducing processor accesses and processor latency time for processing data transfers, with enhanced hardware and power consumption, using hardware-based snoop logic streaming timers.

According to an aspect of disclosed embodiments, a system is provided. The system includes one or more computer processors, and a memory containing a program which when executed by the one or more computer processors performs an operation. The operation comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration to the host interface connection. The system enables enhanced processing speed, reducing processor accesses and processor latency time for processing data transfers, with enhanced hardware and power consumption, using hardware-based snoop logic streaming timers.

According an aspect of disclosed embodiments, a computer program product is provided. The computer program product includes a computer-readable storage medium having computer-readable program code embodied therewith, the computer-readable program code executable by one or more computer processors to perform an operation. The operation comprises monitoring, using hardware-based snoop logic, a completion queue entry (CQE) being written to a completion queue in a defined memory area, where the CQE includes an identifier of a host interface connection; configuring predefined events based on the CQE and predefined configuration information for the host interface connection; and initiating a streaming timer, based on the predefined events, to provide streaming data status and a streaming timer expiration to the host interface connection. The computer program product enables enhanced processing speed, reducing processor accesses and processor latency time for processing data transfers, with enhanced hardware and power consumption, using hardware-based snoop logic streaming timers.

Additionally, for an embodiment of the present disclosure where initiating the streaming timer further comprises initiating an interpacket timer, based on the predefined events, to monitor interpacket arrival times of a given configuration for the host interface connection set by a host. The embodiment uses hardware-based snoop logic streaming timers and interpacket timers based on the predefined events, to enable reduce processor accesses and processor latency time for processing data transfers.

Additionally, for an embodiment of the present disclosure where initiating the interpacket timer further comprises detecting an interpacket timer expiration in response to a predefined timeout interval between packet arrivals and cancelling the streaming timer. The embodiment uses hardware-based snoop logic streaming timers and interpacket timers based on the predefined events, to enable reduce processor accesses and processor latency time for processing data transfers.

Additionally, for another embodiment of the present disclosure where initiating a streaming timer further comprises detecting the streaming timer expiration and cancelling the interpacket timer. The embodiment uses hardware-based snoop logic streaming timers and interpacket timers based on the predefined events, to enable reduce processor accesses and processor latency time for processing data transfers.

Additionally, for another embodiment of the present disclosure where the streaming timer and the interpacket timer are initiated based on a given host defined configuration for the host interface connection, and where the host defined configuration includes a first timeout interval for the streaming timer and a second timeout interval for the interpacket timer. The embodiment uses hardware-based snoop logic streaming timers and interpacket timers based on the predefined events, to enable reduce processor accesses and processor latency time for processing data transfers.

Additionally, for an embodiment of the present disclosure where the completion event entry includes a connection ID associated with the host interface connection and a queue ID for the connection ID, and where initiating the streaming timer further comprises triggering the streaming timer based on one or more packet arrivals for the connecting ID and the queue ID. The embodiment uses hardware-based snoop logic streaming timers and interpacket timers based on the predefined events, to enable reduce processor accesses and processor latency time for processing data transfers.

Additionally, for an embodiment of the present disclosure where initiating the streaming timer further comprises maintaining a timer array function for assigning each new streaming timer, wherein the new streaming timers are assigned in continuous locations in the timer array with unused locations left toward an end of the timer array. The embodiment provides a timer array function that enables reduced hardware and power consumption to maintain streaming timers.

Additionally, for an embodiment of the present disclosure the assigning a new streaming timer further comprises capturing a Time-of-Day (ToD) value in the array location for an activated new streaming timer, updating the timer-free pointer for a next array location and incrementing the timer-free pointer, and updating the timer array for each new streaming timer assignment. The embodiment provides a timer array function that enables reduced hardware and power consumption to maintain streaming timers.

Additionally, an embodiment of the present disclosure further comprises in response to identifying a Time-of-Day (ToD) change, performing an array walk-through based on the ToD change, identifying a non-timed-out entry, incrementing the read pointer and incrementing the write pointer for the non-timed-out entry; identifying a timed-out entry of the timer array, only incrementing the read pointer, and writing a next non-timed-out entry to the free space created due to the timed out timer. The embodiment provides a timer array function that enables reduced hardware and power consumption to maintain streaming timers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
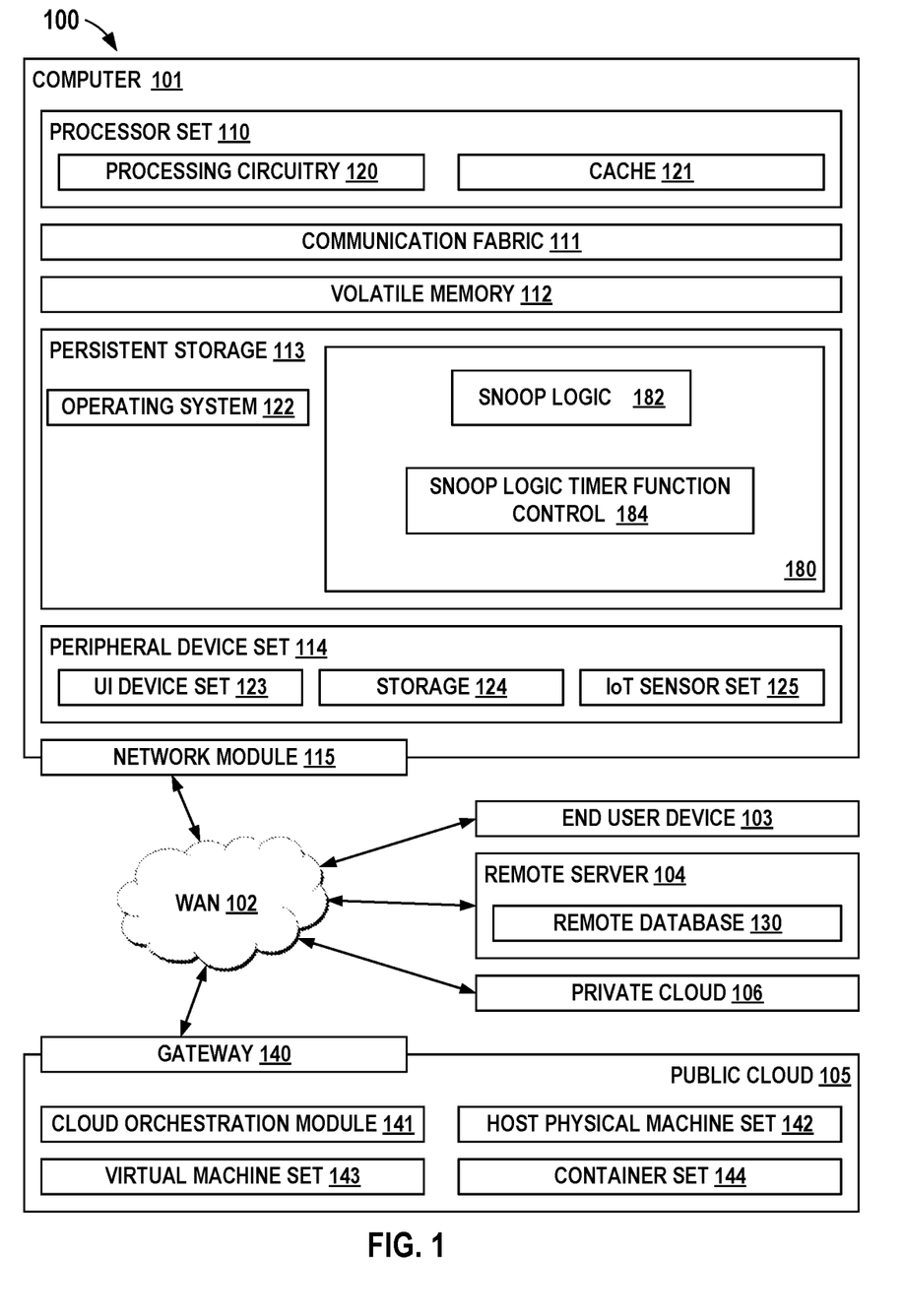
FIG. 1 is a block diagram of an example computer environment for use in conjunction with one or more disclosed embodiments.

Referring to FIG. 1, a computing environment 100 contains an example of an environment for the execution of at least some of the computer code involved in performing the inventive methods, such as a Snoop Logic 182, and a Snoop Logic Timer Function Control 184, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
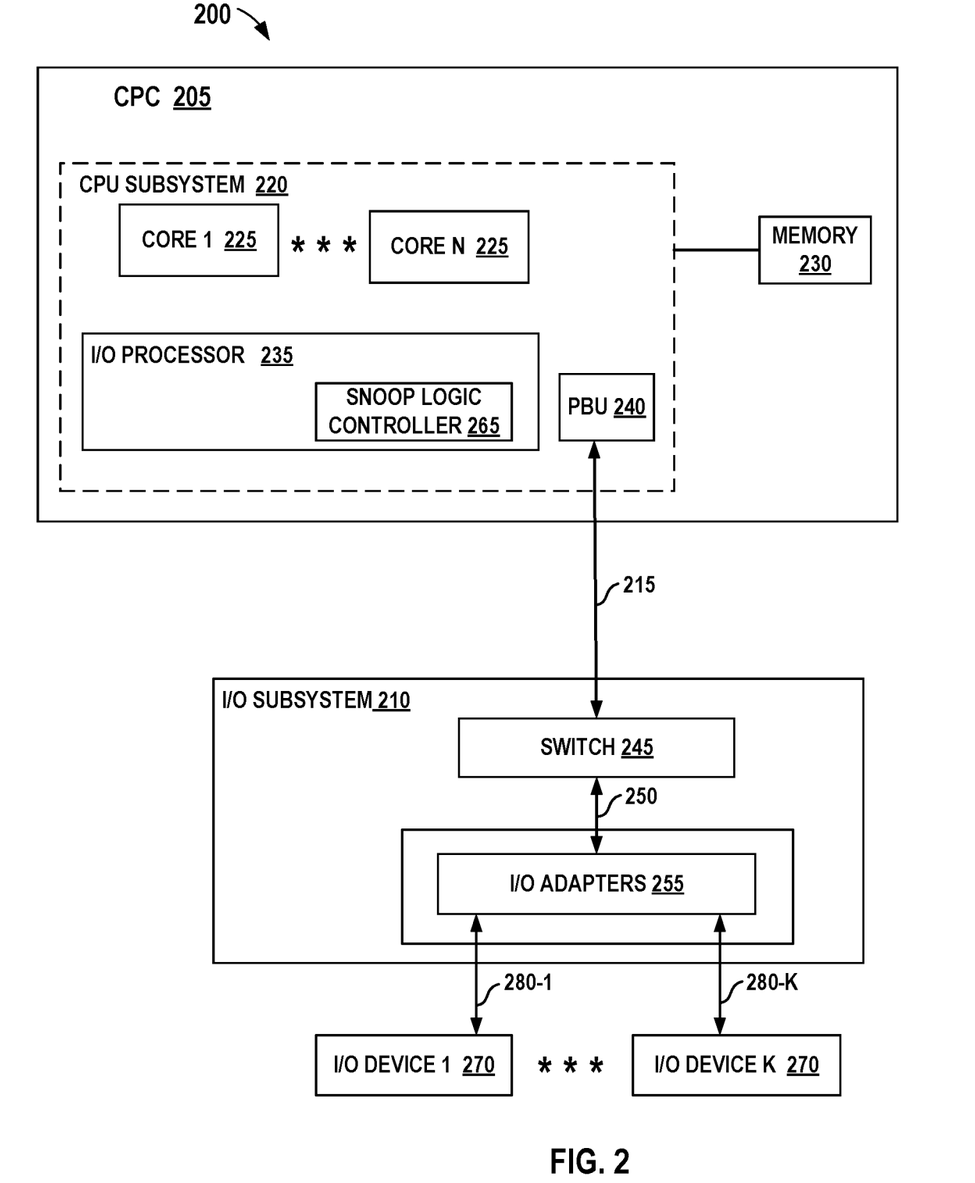
FIG. 2 is a block diagram of an example computing system for implementing hardware-based snoop logic timer functions for streaming timers and interpacket timers for data transfer of one or more embodiments of the present disclosure.

FIG. 2 is a block diagram of an example computing system 200 for implementing hardware-based snoop logic timer functions for streaming timers and interpacket timers for data packet transfer of one or more embodiments of the present disclosure. The features described with respect to the computing system 200 may be used in conjunction with other embodiments described herein. For example, the computing system 200 may represent one example implementation of the computer 101 in FIG. 1. In some embodiments, the computing system 200 may be implemented as a server computer or a mainframe computer. However, various other implementations of the computing system 200 are also contemplated.

As shown, the computing system 200 comprises a central processing complex (CPC) 205 that is communicatively coupled with an input/output (IO) subsystem 210. The CPC 205 comprises a central processing unit (CPU) 220 and a memory 230, which may include volatile memory and/or persistent storage. The CPU subsystem or CPU 220 comprises a plurality of processor cores 225 1-N having any suitable implementation.

The CPU 220 also includes an I/O processor 235, which is communicatively coupled with the processor cores 225 1-N. In an embodiment, the CPU 220 includes a peripheral component interconnect express (PCIe) bridge unit (PBU) 240 that is communicatively coupled with the I/O processor 235 and with the I/O subsystem 210. The I/O processor 235 includes a snoop logic controller 265 that is configured to monitor PCIe bus traffic that is exchanged between the CPC 205 and the I/O subsystem 210, snoop certain I/O events that occur within the traffic, and process the I/O events. The snoop logic controller 265 may include hardware, firmware, software, microcode, and/or a combination thereof. The snoop logic controller 265 is configured to implement Snoop Logic 182, and Snoop Logic Timer Function Control 184 of disclosed embodiments. Note that while various components are described as being included in the CPU 220, alternate embodiments may have different arrangements of the components within the CPC 205. For example, the I/O processor 235 may be implemented separate from the CPU 220 in certain embodiments.

The IO subsystem 210 comprises a switch 245 that is communicatively coupled to the PBU 240 via communication links 215, 250 and with one or more IO adapters 255 of the IO subsystem 210 via communication links 250. The communication links 215, 250 are implemented using a plurality of conductors in any suitable form (e.g., conductive traces or wires). In one non-limiting example, the communication links 215, 250 each comprise an 8-lane PCIe connection, where each of the lanes comprises a respective two conductors. Other configurations of the communications links 215, 250, which may include the use of different protocols, are also contemplated. The plurality of IO adapters 255 connect the computing system 200 one or more I/O devices 270, examples of which may include network interface cards (NICs) (also known as network cards), storage devices, and printers, as illustrative, non-limiting examples. In certain embodiments, one or more of the I/O adapters 255 may connect the computing system to an external network (not shown) (e.g., storage area network (SAN) having one or more storage devices), using any suitable technology such as Ethernet.

The computing system 200 (more specifically, the I/O processor 235) defines multiple channels 280 (or communication paths) between the CPC 205 and I/O devices 270. Each channel 280 is assigned a distinct channel path identifier (CHPID), which may represent a physical channel port location (PCHID), a logical channel subsystem, or a combination thereof. In certain embodiments, the channels 280 established by the I/O processor 235 are virtualized, so that any operating system instance executing on one of the processor cores 225 1-N is able to access any channel.

The architecture of the computing system 200, and more specifically the use of the I/O processor 235 within the CPC 205, provides a number of benefits. In general terms, the computing system 200 provides a more efficient operation reflecting updates to the architecture of the CPC 205. For instance, providing the I/O processor 235 within the CPC 205 shortens a path length from the processor cores 225 1-N to the I/O functionality, supporting greater throughput and responsiveness. The I/O processor 235 may be reconfigured and therefore adaptable to new types of communication links used by the I/O subsystem 210. Additionally, use of the I/O processor 235 allows new types of I/O adapters 255 to be integrated into the computing system 200 without requiring development of custom interface hardware in the I/O subsystem 210 (e.g., implemented using a unique ASIC and I/O card). In this way, the overall cost of the computing system 200 and/or its power consumption may be reduced.

Figure 3:
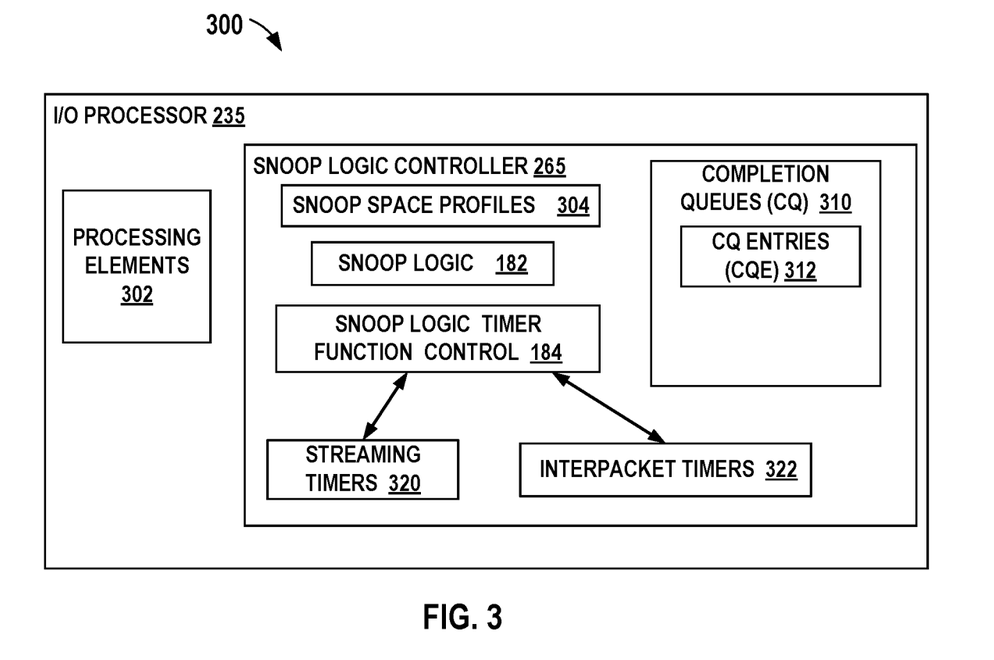
FIG. 3 is a block diagram further illustrating components of the example computing system of FIG. 2 of one or more embodiments of the present disclosure.

Referring now to diagram 300 of FIG. 3, in which the IO processor 235 comprises a plurality of processing elements 302, the snoop logic controller 265, and one or more completion queues 310. The one or more processing elements 302 generally provide connectivity for the channels 280 as well as implement protocols on the channels 280. The plurality of processing elements 302 may have any suitable implementation. In one non-limiting example, the plurality of processing elements 302 implement the RISC-V instruction set architecture, which allows the plurality of processing elements 302 to be dynamically updated to support new features and/or functions, as well as to provide functionality beyond the operations described herein. Each completion queue 310 generally holds events that indicate the completion of data transfer operations. For example, a completion queue 310 may include one or more completion queue entries 312, where each completion queue entry 312 includes predefined information about a completed work request of I/O shared adapter 255.

In general, when a transmit or receive adapter operation completes, a completion event is generated. In conventional systems, the network adapter places the completion event in a completion queue entry on a completion queue, and a network device driver (e.g., an operating system) generally must monitor and process the completion queue entries in order to process the completion events. In conventional systems however, in some instances, this requires software interaction with the network adapter to determine when the CQEs are written and reading the memory areas being written by the adapter, to process the CQEs, which can cause cache thrashing.

In one or more embodiments, the snoop logic controller 265 includes snoop logic 182, snoop logic timer function control 184, and snoop space profiles 304. The snoop logic 182 is configured to snoop certain I/O events that occur in the computing system 200, and is used with snoop logic timer function control 184 for implementing a set of timer functions of a streaming timer 320 and an interpacket timer 322 of disclosed embodiments.

In particular, the snoop logic 182 can detect in hardware when the network adapter (e.g., I/O adapter 255) writes entries to a completion queue 310. Upon detecting that an entry 112 has been written to a completion queue 310, the snoop logic 182 can send an indication to the network device driver (e.g., operating system 122) that a new completion queue entry 112 has been written. In certain embodiments, the network device driver may receive the indication before the I/O adapter 255 completes writing the completion queue entry 112.

As shown in an embodiment of FIG. 3, the snoop logic controller 265 is configured with one or more snoop space profiles 304. Each snoop space profile 304 is associated with a defined memory area (or range of memory addresses), which maps to a respective completion queue 310. For example, each snoop space profile 304 may include a number of bits that defines a respective memory range for completion events. In one example implementation, each snoop space profile 304 includes a 15-bit space offset and 17-bit size. In certain aspects, a first set of the snoop space profiles 304 may be used for transmit adapter operations (e.g., data being transferred from an I/O device 270) and a second set of the snoop space profiles 304 may be used for receive adapter operations (e.g., data being transferred to an I/O device 270).

In system 200, snooping for completion events (e.g., implemented with the snoop logic controller 265 and snoop logic 182) can eliminate the need to poll or use an interrupt scheme to determine when receive (RX) completion events occur, and when transmit (TX) completion events occur. Each completion queue (CQ) 310 includes one or more completion queue entries (CQE) 312 of disclosed embodiments, for example, storing the data that should be processed by a host in one of a plurality of receive (RX) data queues where the plurality of RX data queues facilitates data transfer between a shared network adapter 255 and the host in the computing system 200.

The snoop logic controller 265 includes the snoop logic 182, and the snoop logic timer function control 184 of disclosed embodiments. In an embodiment, the snoop logic 182 is a hardware entity configured for snooping events received from the I/O adapter 255 into memory 230 via the PBU 240. For example, the snoop logic 182 snoops, (i.e., monitors), PCI Express (PCIe) traffic completion events across a communication interface, such as the PBU 240, to a predefined location within the memory 230. Snoop logic 182 detects completion events including specific information pertinent to the respective host interface and respective connections for queues of the actual data. Each host interface typically includes its own criteria or predefined configuration information, for example defining when to be notified for specific events that occur, including specific timer events based on snoop logic timers, such as timeout of streaming timers 320 and interpacket timers 322.

In a disclosed embodiment, the snoop logic 182 detects when the I/O adapter writes entries to a given CQ 310 while the CQEs are being written or in flight, interprets each CQE, and provides one or more configured notifications when a new CQE 312 has been written, based on the defined configuration for a given host interface. The CQEs include a connection ID and a queue ID at specific locations within the CQE, i.e., written in specific fields offsets into the respective completion queue entries.

The snoop logic controller 265 together with the snoop logic 182, and the snoop logic timer function control 184 implement a set of timers comprising a streaming timer 320 and an interpacket timer 322 of disclosed embodiments. In an embodiment, the snoop logic 182 implements the streaming timer 320 for streaming data status notifications, for example used to indicate if a transmit data stream is operational, or a streaming data connection exists, and indications of expiration of the streaming timer 320, where the expiration of the streaming timer is an unconditional timeout after a certain period set for a specific host interface connection. The snoop logic 182 provides notifications for the specific connection along with the specific queue for a streaming timer 320 that has expired, enabling timely updates to different hosts where different streaming events are occurring across different periods of time, for a multiplicity of the queues and connections (i.e., host interface connections).

The snoop logic controller 265 with snoop logic 182 monitors data transfer operations, snooping on multiple different queues at the same time, and sets a streaming timer 320 and an interpacket timer 322 on any queue and any host interface. In one embodiment of the snoop logic controller 265 may include two thousand (2000) or more connections, each host interface connection for each queue including streaming timers 320 and interpacket timers 322. For example, in an embodiment, the streaming timers 320 are implemented in arrays based on the large number of streaming timers being maintained. For example, each host interface may configure or set a streaming timer 320 with a defined timeout value to start after a first packet arrives for a new host interface connection, where the defined timeout value equals a set number of microseconds or milliseconds, which is selectively configured according to each different host interface. The snoop logic 182 triggers a given streaming timer 320 to start, and when the timer expires (e.g., at the defined timeout interval, or when reset or cancelled by the interpacket timer 322), the snoop logic 182 configures predefined events, notifying microcode and/or certain hardware with specific queues, for example, for a given host interface connection ID and a given queue ID of the streaming timer 320 expiration. The expiration of a given interpacket timer 322 occurs when a next packet is not received within a defined interval of time between packet arrivals; otherwise, the interpacket timers 322 do not expire. An expiration of the interpacket timer 322 automatically resets the associated streaming timer 320, and the streaming timer expiration resets or cancels the interpacket timer. In an embodiment, snoop logic 182 implements the streaming timers 320 and the interpacket timers 342 for every receive queue under every host interface connection that have timers set, according to a criteria set by each respective host defining when notifications are wanted.

In conventional arrays based streaming timers, when a timer is activated, a current Time of Day (ToD) value is captured in an array location for the timer and upon a ToD change, an array timeout walk-through is performed, comparing each location with the ToD value, where matching the ToD value will cause a timer timeout. One existing method uses an enable bit provided outside the timer array per row to indicate if the timer is in use, and there can be expired timers (holes) in the middle of the array, with complex logic often used to locate a first available timer for assigning a new timer.

Figure 4:
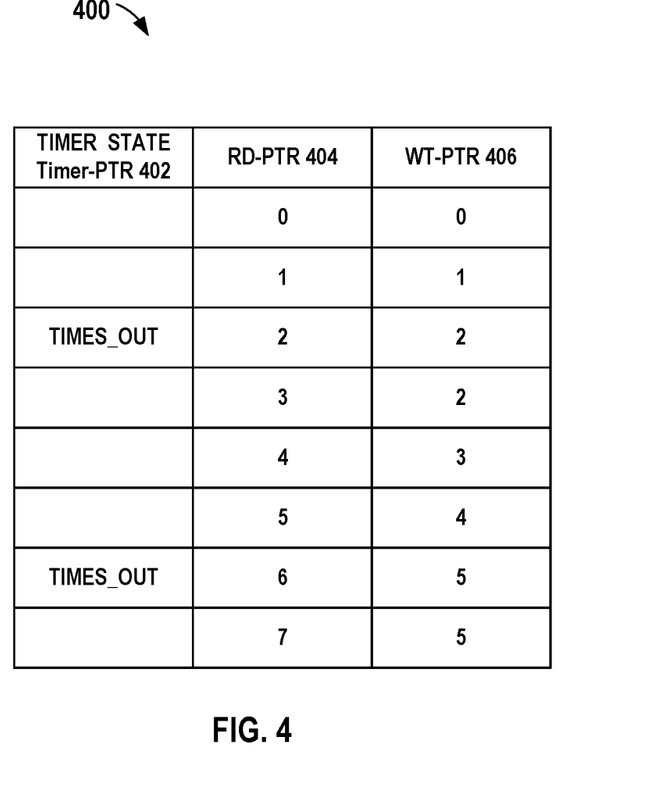
FIG. 4 illustrates example streaming timer array function of one or more embodiments of the present disclosure.

In an embodiment, a disclosed method re-orders the timer locations during array walk-though to identify timer timeout, providing the timers used in continuous locations in the timer array leaving the unused locations towards the end of the array. FIG. 4 illustrates an example streaming timer array function 400 for implementing streaming timers 320 of one or more embodiments of the present disclosure to reorder the timer locations during array walk-though to identify timer timeout, providing the timers used in continuous locations in the timer array leaving the unused locations towards the end of the timer array.

Having reference to FIG. 4, assume for example that a read from a timer array is always written back in the same cycle (while it should be understood some optimization may be performed for the number of writes, and also a data write for the timer array may be performed in the next cycle). In FIG. 4, the illustrated streaming timer array function 400 includes hardware pointers comprising a Free-Timer-Ptr 402 (e.g., where a timeout of an assigned streaming timer is indicated for the Timer Free pointer 402), a Read Rd-Ptr 404, and a Write Wr-Ptr 406 used during timer array walk-through to identify a streaming timer timeout. In an embodiment, the Timer-Free Ptr 402 is used to point at the next free entry in the timer array and is always active. At the beginning, all hardware pointers point to an initial or $0^{th}$ location. When a timer is assigned, the location pointed by Free Timer-Ptr 402 is updated and the Free Timer-Ptr is incremented, which continues for each new timer assignment. When the ToD value changes, an array walk-through engine starts, the Rd-Ptr 404 and Wr_Ptr 406 are reset to 0 and each location is read and written back. If the entry is not timed out, both Rd-Ptr 404 and Wr_Ptr 406 are incremented, as respectively indicated by Rd-Ptr 404 and Wr_Ptr 406 values 1, 1, and 2, 2. If the entry has timed out, only Rd-Ptr 404 is incremented and the Wr_Ptr 406 is not incremented, indicated by Rd-Ptr 404 and Wr_Ptr 406 values 3, 2 following the illustrated Time_Out. As a result, the next non-timed out entry is written to the free space created due to timer Time_Out. Array walk-though continues until the Rd_Ptr 404 reaches Free_ptr 402, where all the active array entries have been covered. At the end of walk-through, the Timer Free_Ptr 402 is updated with Wr_ptr 406, which marks the new starting of free entries after the array reorder. Advantages provided by the timer array function 400 include less hardware required and less power consumed as compared to certain conventional methods and the timer array function 400 generally is simple to implement. In some conventional methods, complex logic is used to find the first free timer, for example from a 512-bit vector (e.g., to find a first zero location of the first free timer).

Figure 5:
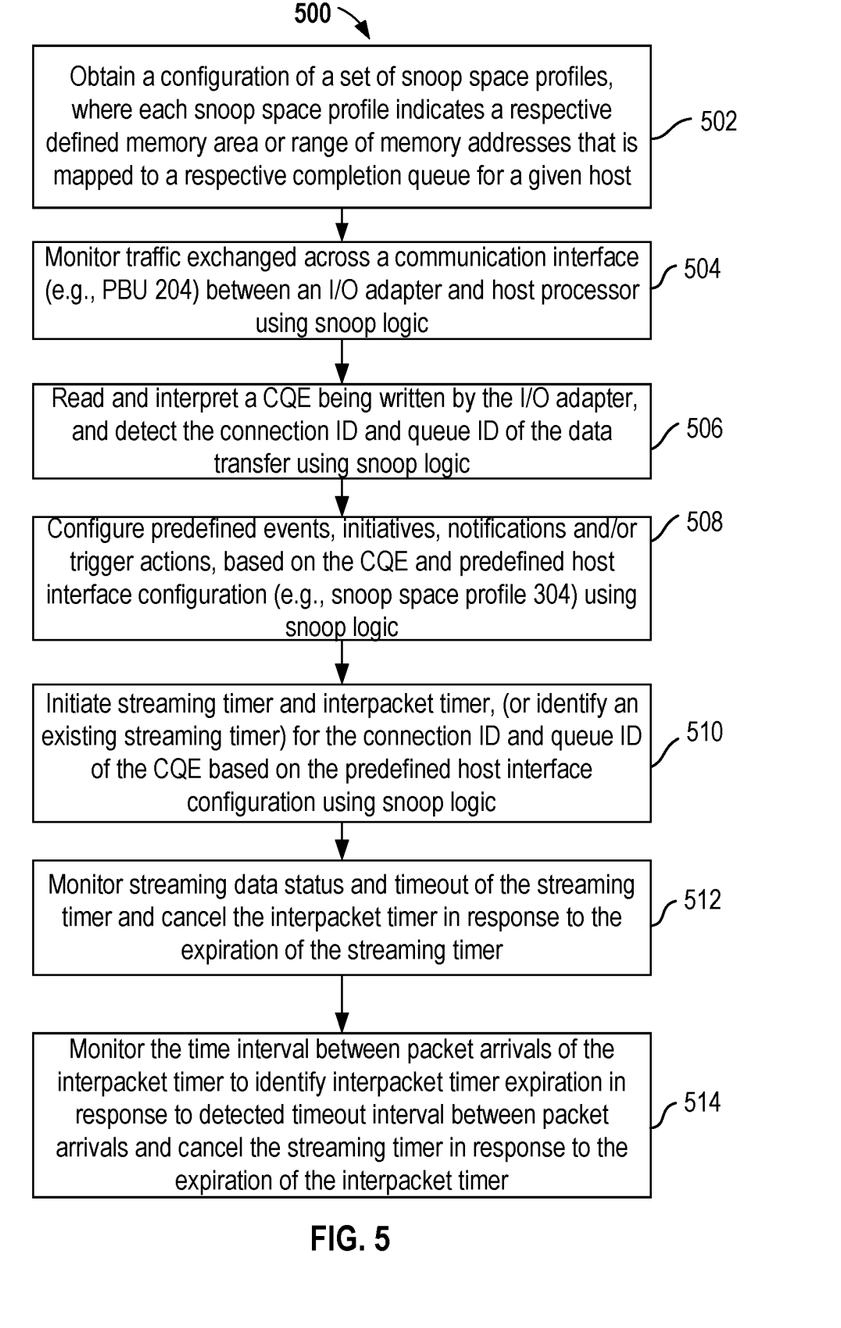
FIG. 5 is a flowchart illustrating example operations of a method for implementing hardware-based snoop logic timer functions for streaming timers and interpacket timers for data transfer of one or more embodiments of the present disclosure.

FIG. 5 is a flowchart illustrating example operations of a method 500 for implementing hardware-based snoop logic timer functions for streaming timers 320 and interpacket timers 322 for data transfer of one or more embodiments of the present disclosure. Method 500 can be implemented by system 200 using the snoop logic controller 265 with Snoop Logic 182, the Snoop Logic Timer Function Control 184, and the computer 101 of FIG. 1 in accordance with one or more disclosed embodiments.

At block 502, system 200, using the snoop logic controller 265, obtains a configuration of a set of snoop space profiles 304, where each snoop space profile 304 indicates a respective memory range that is mapped to a respective completion queue. At block 504, the Snoop Logic 182 monitors traffic exchanged across a communication interface (e.g., communication interface 215, PBU 204) between an I/O adapter 255 and a processor or CPU 220. At block 506, in an embodiment, as the I/O adapter 255 writes a given CQE 312, the Snoop Logic 182 reads and interprets the CQE is being written, detecting the connection ID and the queue ID (QID) of the transfer data. At block 508, the Snoop Logic 182 configures predefined events, providing defined initiatives, notifications and/or trigger actions, based on the CQE and based on a predefined or set configuration, (e.g., snoop space profile 304).

At block 510, system 200 initiates a streaming timer 320 based on the set configuration for the host interface connection ID and the QID of the receive data being written, and initiates an interpacket timer 322 based on the set configuration. In a disclosed embodiment, the streaming timer 320 and the interpacket timer 322 are configured or instantiated based on a given host defined configuration. The host defined configuration includes timeout values for the timers, and once the timers are set by the microcode, the next CQE arrival for the matching connection ID and QID will cause the timer logic to start. The Snoop Logic 182 monitors receive data being written, and the completion event or CQE contains the connection ID associated with the host interface and the queue QID for a new, existing or expired streaming timer, indicating whether the associated timer is active or not active. For example, the streaming timer 320 can be set to start with a next packet that arrives following the CQE that causes that timer to trigger and start ticking. For example, the streaming timers 320 and the interpacket timers 322 can implement unique timers across multiple different queues running simultaneously for different host interface connections. As shown at block 512, during data transfer operations, the snoop logic 182 monitors the streaming data status and timeout of the respective streaming timers 320 and cancels the interpacket timer in response to the streaming timer expiration. At block 514, during data transfer operations, the snoop logic 182 the snoop logic monitors the time interval between packet arrivals, to identify the interpacket timer expiration, and cancels the streaming timer in response to the interpacket timer expiration. In a disclosed embodiment, the snoop logic 182 triggers the expiration of the interpacket timer 322 based on identifying the set timeout value between packet arrivals, which automatically cancels the streaming timer 320 based on the interpacket timer expiration.

Figure 6:
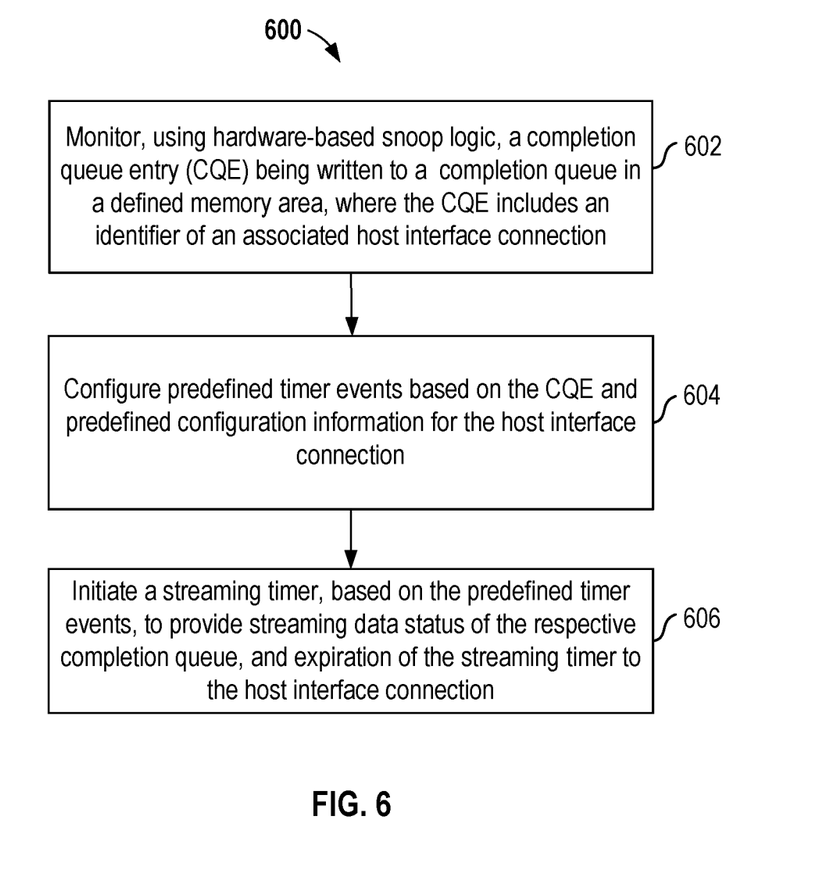
FIG. 6 is a flowchart illustrating example features and operations of a method for implementing hardware-based snoop logic timer functions for streaming timers of one or more embodiments of the present disclosure.

FIG. 6 illustrate example features and operations of a method 600 for implementing hardware-based snoop logic timer functions for streaming timers 320 of one or more embodiments of the present disclosure. Method 600 can be implemented by system 200 using the snoop logic controller 265 with the snoop logic 182 and snoop logic timer function control 184, implementing streaming timers 320 and interpacket timers 322 of disclosed embodiments.

At block 602, system 200 monitors, using hardware-based snoop logic, a completion queue entry (CQE) being written to a completion queue in a defined memory area, where the CQE includes an identifier of an associated host interface connection. In a disclosed embodiment, the identifier of the associated host interface connection includes a connection ID and a queue ID and predefined configuration information for the host interface connection.

At block 604, system 200 configures predefined events based on the CQE and predefined configuration information for the host interface connection. The hardware-based snoop logic 182 is configured based on predefined configuration information provided by the host, which can configure microcode to the snoop logic to detect predefined or set events, for example to provide interrupts to the host for one or more predefined events. The hardware-based snoop logic 182 detects one or more predefined events based on (i) a set timeout interval for the streaming timer expiration, (ii) the interpacket gap when packets do not arrive within a set specific amount of time or timeout interval, and/or (iii) a next packet arrival, for example to provide an interrupt to the host operating system.

At block 606, system 200 initiates a streaming timer, (e.g., using the hardware-based snoop logic 182) based on the predefined events, to provide streaming data status and a streaming timer expiration to the host interface connection. The hardware-based snoop logic 182 also initiates the interpacket timer 322 based on the predefined events to monitor the interpacket arrival times, and cancels the streaming timer 320 in response the interpacket timer expiration, for example, from the predefined timeout interval between packet arrivals for the given configuration set by the host.

While the foregoing is directed to embodiments of the present invention, other and further embodiments of the invention may be devised without departing from the basic scope thereof, and the scope thereof is determined by the claims that follow.

What is claimed is:

1. A method comprising:
   monitoring, using hardware-based snoop logic, a completion queue entry (CQE) being written to a completion queue in a defined memory area, where the CQE includes an identifier of a host interface connection;
   configuring predefined events based on the CQE and predefined configuration information for the host interface connection; and
   initiating a streaming timer, based on the predefined events, to provide streaming data status and a streaming timer expiration for the host interface connection.

2. The method of claim 1, wherein initiating the streaming timer further comprises initiating an interpacket timer, based on the predefined events, to monitor interpacket arrival times of a given configuration for the host interface connection set by a host.

3. The method of claim 2, wherein initiating the interpacket timer further comprises detecting an interpacket timer expiration in response to a predefined timeout interval between packet arrivals and cancelling the streaming timer.

4. The method of claim 2, wherein initiating a streaming timer further comprises detecting the streaming timer expiration and cancelling the interpacket timer.

5. The method of claim 2, wherein the streaming timer and the interpacket timer are initiated based on a given host defined configuration for the host interface connection, and wherein the host defined configuration includes a first timeout interval for the streaming timer and a second timeout interval for the interpacket timer.

6. The method of claim 1, wherein the completion event entry includes a connection ID associated with the host interface connection and a queue ID for the connection ID, and wherein initiating the streaming timer further comprises triggering the streaming timer based on one or more packet arrivals for the connecting ID and the queue ID.

7. The method of claim 1, wherein initiating the streaming timer further comprises maintaining a timer array function for assigning each new streaming timer, wherein the each new streaming timer is assigned in continuous locations in the timer array with unused locations left toward an end of the timer array.

8. The method of claim 7, wherein maintaining the timer array function further comprises providing a timer-free pointer, a read pointer, and a write pointer, wherein the timer-free pointer points at a next free entry in the timer array and is always active.

9. The method of claim 8, wherein assigning the each new streaming timer further comprises capturing a Time-of-Day (ToD) value in the array location for each activated new streaming timer, updating the timer-free pointer for a next array location and incrementing the timer-free pointer, and updating the timer array for each new streaming timer assignment.

10. The method of claim 8, further comprises in response to identifying a Time-of-Day (ToD) change, performing an array walk-through based on the ToD change, identifying a non-timed-out entry, incrementing the read pointer and incrementing the write pointer for the non-timed-out entry; identifying a timed-out entry of the timer array, only incrementing the read pointer, and writing a next non-timed-out entry to the free space created due to the timed-out timer.

11. A system, comprising one or more computer processors; and a memory containing a program which when executed by the one or more computer processors performs an operation, the operation comprising:
    monitoring, using hardware-based snoop logic, a completion queue entry (CQE) being written to a completion queue in a defined memory area, where the CQE includes an identifier of a host interface connection;
    configuring predefined events based on the CQE and predefined configuration information for the host interface connection; and
    initiating a streaming timer, based on the predefined events, to provide streaming data status and a streaming timer expiration to the host interface connection.

12. The system of claim 11, wherein initiating the streaming timer further comprises initiating an interpacket timer, based on the predefined events, to monitor interpacket arrival times for the host interface connection of a given configuration set by a host.

13. The system of claim 12, wherein initiating the interpacket timer further comprises detecting an interpacket timer expiration in response to a predefined timeout interval between packet arrivals and cancelling the streaming timer.

14. The system of claim 12, wherein initiating the streaming timer further comprises detecting the streaming timer expiration and cancelling the interpacket timer.

15. The system of claim 12, wherein the streaming timer and the interpacket timer are initiated based on a given host defined configuration for the host interface connection, and wherein the host defined configuration includes a first timeout interval for the streaming timer and a second timeout interval for the interpacket timer.

16. A computer program product comprising:
    a computer readable storage medium having computer readable program code embodied therewith, the computer readable program code executable by one or more computer processors to perform an operation, the operation comprising:
monitoring, using hardware-based snoop logic, a completion queue entry (CQE) being written to a completion queue in a defined memory area, where the CQE includes an identifier of a host interface connection;
configuring predefined events based on the CQE and predefined configuration information for the host interface connection; and
initiating a streaming timer, based on the predefined events, to provide streaming data status and a streaming timer expiration to the host interface connection.

17. The computer program product of claim 16, wherein initiating the streaming timer further comprises initiating an interpacket timer, based on the predefined events, to monitor interpacket arrival times for the host interface connection of a given configuration set by a host.

18. The computer program product of claim 17, wherein initiating the interpacket timer further comprises detecting an interpacket timer expiration in response to a predefined timeout interval between packet arrivals and cancelling the streaming timer.

19. The computer program product of claim 17, wherein initiating the streaming timer further comprises detecting the streaming timer expiration and cancelling the interpacket timer.

20. The computer program product of claim 17, wherein the streaming timer and the interpacket timer are initiated based on a given host defined configuration for the host interface connection, and wherein the host defined configuration includes a first timeout interval for the streaming timer and a second timeout interval for the interpacket timer.

* * * * *